2,790,819
Patented Apr. 30, 1957

2,790,819

TRICHLOROPHENYLACETONITRILES

Kenneth L. Godfrey, St. Albans, W. Va., assignor to Monsanto Chemical Company, St. Louis, Mo., a corporation of Delaware No Drawing. Application October 7, 1954,
Serial No. 461,027

2 Claims. (Cl. 260—465)

The present invention relates to trichlorophenylacetonitriles and to methods for their preparation. The new compositions possess unusual properties which render them useful in a number of industrial applications. Moreover, they are valuable intermediates.

The trichlorophenylacetonitriles contain a nitrile group and a phenyl group substituted by three chlorine atoms attached to a central carbon atom, the remaining valences of which are satisfied by hydrogen or lower alkyl groups preferably less than five carbon atoms. While the invention pertains to this class of compounds regardless of the method of preparation, the new compositions are conveniently and preferably derived from chlorinated alkyl benzenes. Nuclear chlorination is effected in the dark in the presence of a halogen carrier like iron. After three chlorine atoms have been introduced in the nucleus the catalyst is carefully removed and chlorination of the side chain effected in the presence of actinic rays. Condensation of the trichlorobenzyl chloride with an alkali metal cyanide then yields the desired nitrile.

Although the preparation of the trichlorobenzyl chlorides has been described, details of a suitable method are given below:

Substantially 1500 parts by weight of dry toluene was charged into a chlorinator of suitable capacity. Substantially 15 parts by weight of iron filings were added as catalyst carrier for ring chlorination and chlorine introduced at about 20° C. During the last part of the run the temperature was increased to about 70° C. in order to keep the reaction mixture fluid and the flow of chlorine continued until the increase in weight corresponded to that calculated for trichlortoluene. Thus, when the product analyzed 54.8% chlorine, the flow of chlorine was interrupted and the trichlortoluene given a 10% caustic wash and filtered through a bed of clay in order to remove the iron. Alternatively, the iron may be removed by distillation of the chlorinated product. The product was then chlorinated at 160° C. in the presence of ultraviolet light until the gain in weight was that calculated for trichlorobenzyl chloride. Analysis of the product for chlorine at this point gave 61.8%.

Monoethylbenzene was chlorinated at 60–80° C. in the presence of iron until the gain in weight approximated that calculated for ethyl trichlorobenzene. The product was distilled and the fraction which boiled at 98–104° C. was chlorinated at 130–140° C. in the presence of actinic rays, iron being carefully excluded, until the gain approximated that calculated for alpha-trichlorphenyl ethylchloride.

Conversion to the nitriles is illustrated by the following detailed examples: Substantially 1690 parts by weight (25.9 moles) of potassium cyanide, 4190 parts by weight of ethyl alcohol and 1600 cc. of water were charged in a suitable reactor equipped with agitator and reflux condenser and warmed to 40° C. with stirring to dissolve most of the potassium cyanide. Substantially 4220 parts by weight (18.3 moles) of trichlorbenzyl chloride prepared as described above was added over a period of 30 minutes at a pot temperature of 36–38° C. Heating was resumed upon which a vigorous reaction set in. The heat of reaction was sufficient to keep the batch at reflux temperature for about an hour without further heating. Heating at reflux temperature was then resumed for four hours and the alcohol removed by distillation. The residue after distillation up to a pot temperature of 90° C. was washed with water, dried and filtered through Attapulgus clay to yield 3790 parts by weight of a pale yellow liquid with a faint cyanide odor. This represents a yield of 93.8% of theory.

A methyl substituted acetonitrile which according to current practice would be called alpha-trichlorophenyl propionitrile results from replacing trichlorobenzyl chloride by alpha-trichlorophenyl ethylchloride in the foregoing procedure.

The trichlorophenylacetonitriles are a most interesting class of compounds. They exhibit a general phytotoxic action in both pre-emergence and foliage applications to living plants characterized by marked hormone effects such as leaf malformation and epinasty. On the other hand, these compositions are useful for combating plant diseases and microorganisms. For example, at concentrations below the phytotoxic threshold trichlorophenylacetonitrile is a systemic fungicide effective against Dutch elm disease and fusarium wilt of tomatoes. This product is active against *Micrococcus pyrogenes* var. *aureus* and *Aspergillus niger*, at least up to dilutions of $\frac{1}{1000}$. Furthermore, the trichlorophenylacetonitriles are powerful rodent repellents useful for treating fiber cartons and the like, thereby rendering them distasteful to rats and other chewing rodents. Of course it will be appreciated that other halogens, especially bromine, may be substituted for chlorine but are more expensive.

It is intended to cover all changes and modifications of the examples of the invention herein chosen for purposes of disclosure which do not constitute departures from the spirit and scope of the invention.

What is claimed is:

1. A polychlorophenylacetonitrile consisting essentially in the composite cyanation product of mixed polychlorobenzyl chlorides prepared by chlorinating toluene in the ring until the gain in weight corresponds to that calculated for trichlorotoluene, then chlorinating in the side chain until the gain in weight corresponds to that calculated for trichlorobenzyl chloride.

2. A method of making a polychlorophenylacetonitrile composite reaction product which comprises chlorinating toluene in the ring in the presence of a halogen carrier until the gain in weight corresponds to that calculated for trichlorotoluene, then chlorinating in the side chain until the gain in weight corresponds to that calculated for trichlorobenzyl chloride, cyanating the resulting product and isolating the composite polychlorophenylacetonitrile.

References Cited in the file of this patent

UNITED STATES PATENTS 2,444,905   Sexton ------------------ July 13, 1948